Oct. 5, 1943.          L. R. LUDWIG ET AL          2,331,209
                   ELECTRICAL DISTRIBUTION SYSTEM
                   Filed March 5, 1942     2 Sheets-Sheet 1

WITNESSES:                                  INVENTORS
                                        Leon R. Ludwig and
                                          John W. May.
                                        BY
                                              ATTORNEY Oct. 5, 1943.  L. R. LUDWIG ET AL  2,331,209

ELECTRICAL DISTRIBUTION SYSTEM

Filed March 5, 1942  2 Sheets-Sheet 2

Fig. 2.

WITNESSES:
E. L. Keiding.
C. L. Friedman

INVENTORS
Leon R. Ludwig and
John W. May.
BY
ATTORNEY

Patented Oct. 5, 1943

2,331,209

UNITED STATES PATENT OFFICE 2,331,209

ELECTRICAL DISTRIBUTION SYSTEM

Leon R. Ludwig, Wilkinsburg, Pa., and John W. May, Durham, N. C., assignors to Westinghouse Electric & Manufacturing Company, East Pittsburgh, Pa., a corporation of Pennsylvania Application March 5, 1942, Serial No. 433,474

18 Claims. (Cl. 175—294)

This invention relates to electrical distribution systems, and it has particular relation to an electrical distribution system having a plurality of circuit breakers designed for coordinated operation under predetermined conditions of the associated distribution system.

In certain electrical distribution systems, a plurality of circuit breakers are desired which trip in a predetermined coordination when a predetermined fault occurs on the system. For example, reference may be made to a network distribution system wherein a plurality of transformers are connected to a common load circuit through transformer circuit breakers. The load circuit is sectionalized between points of connection of adjacent pairs of transformers by means of sectionalizing circuit breakers. When a fault occurs on the load circuit, certain of the sectionalizing circuit breakers trip in advance of their associated transformer circuit breakers in order to relieve the associated transformer circuit breakers of load current. A system of this type is disclosed in the Parson application Serial No. 342,938, filed June 28, 1940, which has issued as Patent 2,317,552.

As a further example of a system wherein circuit breakers are sequentially operated, reference may be made to the Bergvall application, Serial No. 406,136, filed August 9, 1941, which has issued as Patent 2,313,118. In the Bergvall distribution system, a plurality of transformers are connected to a common load circuit through a plurality of transformer circuit breakers. Here again the load circuit is sectionalized between the points of connection of each pair of transformer circuit breakers by means of sectionalizing circuit breakers. Each sectionalizing circuit breaker is so interlocked with an adjacent transformer circuit breaker that it must trip in advance of the associated transformer circuit breaker.

In accordance with the invention, an electrical distribution system is provided with a pair of circuit breakers which are coordinated for response to predetermined conditions occurring on the electrical distribution system. In a specific embodiment of the invention, a pair of circuit breakers are connected by means of a resilient link. A tripping operation of one of the circuit breakers results in the application of an opening force to the remaining circuit breaker through the resilient link. Tripping of the latter circuit breaker additionally may be controlled by means of a latch which is responsive to a predetermined condition of the electrical distribution system, such as the voltage available at the associated circuit breaker.

The invention further contemplates the provision of a reclosing mechanism which operates to reclose the first tripped circuit breaker after a brief interval. Reclosure of this circuit breaker, in turn, conditions the remaining circuit breaker for reclosure provided the voltage available at the latter circuit breaker is above a predetermined value.

It is, therefore, an object of the invention to provide an improved electrical distribution system having a plurality of circuit breakers designed for coordinated operation.

It is a further object of the invention to provide a plurality of circuit breakers interconnected by a resilient link operating to condition one of the circuit breakers for an operation in response to an operation of the second of the circuit breakers.

It is a still further object of the invention to provide a plurality of circuit breakers designed for coordinated operation wherein reclosure of one of the circuit breakers conditions a remaining circuit breaker for reclosure.

It is still another object of the invention to provide a pair of circuit breakers designed for coordinated operation wherein operation of one circuit breaker conditions the remaining circuit breaker for operation, and wherein operation of the second circuit breaker further is controlled in accordance with a predetermined variable.

Other objects of the invention will be apparent from the following description taken in conjunction with the accompanying drawings, in which.

Figure 1:
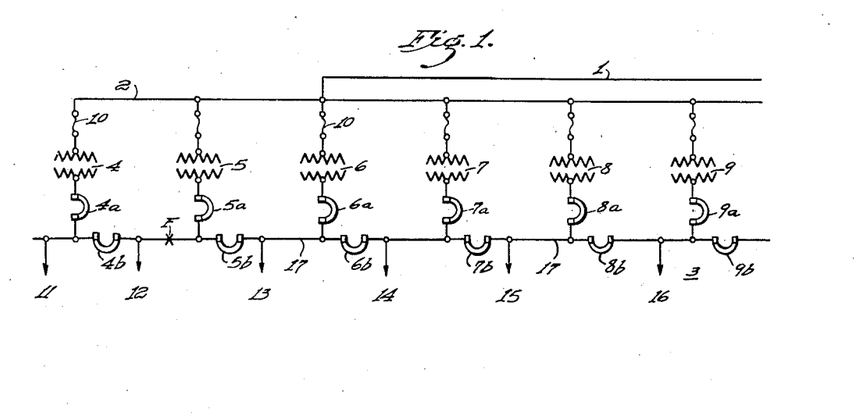
Figure 1 is a schematic view in single line of an electrical distribution system suitable for the application of this invention.

Referring to the drawings, Figure 1 shows a distribution system supplied with electrical energy from a single source 1 of electrical energy which is connected to a branch feeder circuit or bus 2. Although the invention is applicable to systems employing alternating or direct current and to systems energized by polyphase or single-phase energy, it is assumed for the purpose of discussion that Fig. 1 represents a single phase alternating-current system.

As shown in Fig. 1, the branch feeder circuit or bus 2 is connected to a distribution circuit 3 through a plurality of transformers 4 to 9, each having a primary winding connected to the branch feeder circuit or bus. If desired, fuses 10 may be provided between each primary winding and the branch feeder circuit or bus 2.

The distribution circuit 3 includes a plurality of load circuits 11 to 16 which are interconnected by a suitable tie circuit 17. Each of the transformers has its secondary winding connected to the distribution circuit through a separate main or transformer circuit breaker 4a to 9a. By inspection of Fig. 1, it will be observed that the transformers 4 to 9 are connected in parallel for the purpose of energizing the distribution circuit 3.

In order to increase the flexibility of the system illustrated in Fig. 1, the tie circuit 17 is sectionalized by means of sectionalizing circuit breakers positioned between the points of connection of the transformers to the distribution circuit. In the specific embodiment of Fig. 1, each of the transformer circuit breakers 4a to 9a has associated therewith a sectionalizing circuit breaker 4b to 9b.

Each sectionalizing breaker is designed to control in part the tripping of its associated transformer breaker. For example, the sectionalizing circuit breaker 4b controls in part the tripping of the transformer circuit breaker 4a. In an analogous manner, the sectionalizing circuit breaker 5b controls in part the tripping of the transformer circuit breaker 5a.

With this brief description of the system of Fig. 1 in mind, it is believed that a description of the operation of the system will assist in an understanding of the invention. It will be assumed first that the system of Fig. 1 is in normal operation with all of the circuit breakers closed. Should a fault F occur on the distribution circuit, as indicated adjacent the load circuit 12, an excessive current flows through the adjacent transformers 4 and 5. Since the sectionalizing circuit breaker 4b is designed to trip in advance of the transformer circuit breaker 4a in response to such a fault, the sectionalizing circuit breaker is the first of these two breakers to open. The opening of the sectionalizing circuit breaker 4b relieves the transformer 4 of the excessive burden imposed by the fault F. Consequently, the transformer circuit breaker 4a remains closed, and the transformer 4 continues to supply electrical energy to the load circuit 11 without interruption.

The excessive current flowing through the transformer 5 tends to trip the associated transformer circuit breaker 5a. However, because of the correlation between the tripping of this circuit breaker and that of the associated sectionalizing circuit breaker 5b, the sectionalizing circuit breaker 5b is the first to trip. This disconnects the fault F from the portion of the distribution circuit to the right of the sectionalizing circuit breaker 5b as viewed in Fig. 1. Consequently, the transformers 6 to 9 continue to supply current to the loads 13 to 16 without interruption.

By inspection of Fig. 1, it will be noted that tripping of the sectionalizing circuit breaker 5b does not affect the connection between the fault F and the transformer circuit breaker 5a. Consequently, the circuit breaker 5a trips to disconnect the transformer 5 from the fault F and from the associated load circuit 12. This means that the entire distribution circuit 3 with the exception of the load circuit 12 continues to receive electrical energy without interruption. To assure proper functioning of this system, it is desirable that the tripping of the various circuit breakers be effected with time delay and preferably with inverse time delay.

To illustrate the desirability of the sectionalizing circuit breakers, let it be assumed that such circuit breakers are not provided. If the loads on the load circuits 13 and 14 are heavy, the resulting burden on the adjacent transformer 6 after the circuit breaker 5a trips may be sufficient to trip the transformer circuit breaker 6a. This tripping of the transformer circuit breaker 6a would transfer the excessive load to the next transformer 7. The tripping of the transformer circuit breaker 7a in response to this excessive burden would in turn transfer an excessive burden to the transformer 8. This continued transfer or "cascade" effect would continue until all of the transformer circuit breakers 6a to 9a had tripped with a resulting termination of service to the load circuits 13 to 16.

The cascade tripping of the circuit breakers 6a to 9a is prevented by operation of the associated sectionalizing circuit breakers. If the loads on the load circuits 13 and 14 are heavy, the sectionalizing circuit breaker 6b trips in advance of the transformer circuit breakers 6a. This relieves the transformer 6 of the load circuit 14 and the transformer continues to supply electrical energy to the load circuit 13 without interruption. Consequently, by operation of the sectionalizing circuit breakers, a reasonably satisfactory distribution of load is assured for the system.

Figure 2:
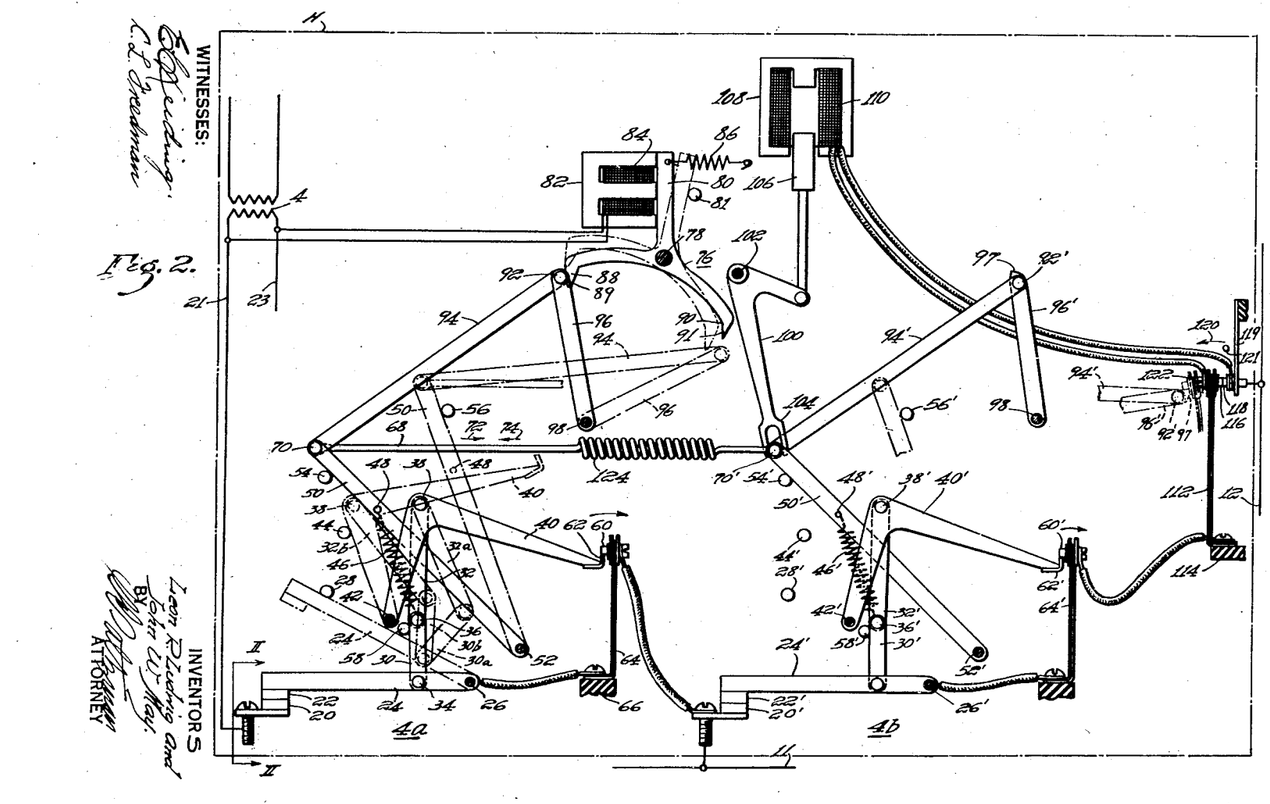
Fig. 2 is a schematic view with parts in elevation showing a pair of interconnected circuit breakers embodying the invention.

Although each sectionalizing circuit breaker may be displaced appreciably from its associated transformer circuit breaker, preferably they are located adjacent each other and conveniently they and the associated transformer may be included in the same transformer housing H (see Fig. 2). A suitable construction for these circuit breakers and their control circuits are illustrated in Fig. 2. Since each group comprising a transformer, circuit breaker and its sectionalizing circuit breaker, is similar to the remaining groups, a description of one of the groups, such as that including the circuit breakers 4a and 4b, will suffice.

Figure 3:
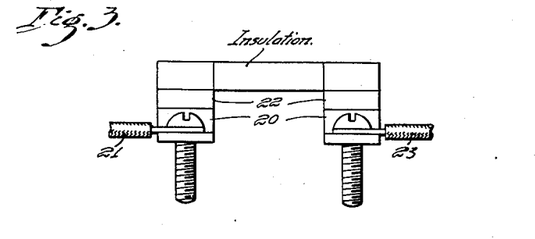
Fig. 3 is a detailed view in end elevation of a portion of one of the circuit breakers of Fig. 2.

In Fig. 2, the transformer 4 is illustrated as connected to the stationary contacts 20 of the two-pole transformer circuit breaker 4a through conductors 21 and 23. The two-pole construction of this circuit breaker is illustrated more clearly in Fig. 3. These stationary contacts 20 are positioned in the path of a pair of movable contacts 22 which are mounted at one end of an arm 24. The arm 24 is pivoted on a stationary pivot 26 for pivotal movement from the position wherein the contacts 22 and 20 are in engagement, as shown in full lines in Fig. 2, to a position wherein the contacts are spaced as illustrated in dotted lines in Fig. 2. In the latter position, the arm 24 is in engagement with a stationary abutment 28.

Movement of the arm 24 between its open and closed positions is controlled by a pair of arms 30 and 32 which forms a toggle mechanism. The arm 30 has one end pivotally connected to the arm 24 by means of a pin 34. The remaining end of the arm 30 is pivotally connected to one end of the arm 32 by means of a pin 36. A pivot pin 38 connects the remaining end of the arm 32 to a lever 40 which is pivoted for movement about a stationary pin 42.

Movement of the lever 40 is from the position illustrated in full lines in Fig. 2 to a position illustrated in dotted lines wherein the lever 40 engages a fixed abutment 44.

Operation of the toggle mechanism formed by the arms 32 and 30 is effected by a tension spring 46 which has one end connected to the pin 36 and a second end connected to a lug 48 carried by an operating arm 50. This operating arm 50 has one end pivotally connected to a stationary shaft 52 which permits movement of the arm 50 from the position shown in full lines in Fig. 2 to the position illustrated in dotted lines. Extreme positions of the arm 50 are determined, respectively, by fixed abutments 54 and 56.

Operation of the toggle mechanism formed by the arms 30 and 32 is determined by the position of the lug 48 with respect to the pin 38. If the lug 48 is on the left of the pin 38 as illustrated in full lines in Fig. 2, the line of action of the spring 46 urges the pin 36 to the left to a position determined by a fixed abutment 58. In this position, the arms 30 and 32 are substantially in vertical alignment and the contacts 20 and 22 are closed.

If the lug 48 is on the right of the pin 38, the line of action of the spring 46 is such that the force applied to the pin 36 breaks the toggle mechanism formed by the arms 30 and 32 and moves the arms to the positions shown in dotted lines which are designated by the reference characters 30a and 32a. Such movement of the lug 48 with respect to the pin 38 is effected by actuation of the operating arm 50 to the position shown in dotted lines, wherein the operating arm 50 engages the fixed abutment 56.

Should the pivot pin 38 move to the left of the lug 48, as indicated by dotted lines in Fig. 2, the line of action of the spring 46 is such that the toggle mechanism formed by the arms 30 and 32 again is broken and the arms 30 and 32 move to the positions illustrated in dotted lines and designated by the reference characters 30b and 32b. This movement of the pin 38 is effected by actuation of the lever 40 from the position illustrated in full lines in Fig. 2 to the position illustrated in dotted lines. It will be observed that with the arms in the positions designated by the reference characters 30b and 32b, the arm 24 of the circuit breaker again is in the position illustrated in dotted lines and the contacts 20 and 22 are separated.

Summarizing the operation of the circuit breaker 4a, if the arm 50 and the lever 40 are in the positions illustrated in full lines in Fig. 2, the circuit breaker is closed.

Should the operating arm 50 be actuated to the position illustrated in dotted lines, the circuit breaker 4a would be opened.

Furthermore, if the lever 40 moves to the position shown in dotted lines in Fig. 2, the breaker 4a would open regardless of the position of the operating arm 50.

Normally, the lever 40 is maintained in the position illustrated in full lines by means of a lug 60 positioned in the path of movement of a tongue 62 carried by the lever 40. The lug 60 is positioned at one end of a bimetallic spring 64 which has its other end fixed to an abutment 66. Consequently, under normal conditions, operation of the circut breaker 4a is controlled by actuation of the operating arm 50.

The sectionalizing circuit breaker 4b is similar in construction to the portion of the circuit breaker 4a thus far specifically described. Similar parts of the circuit breaker 4b are designated by similar reference characters which are distinguished by prime marks.

Operation of the circuit breaker 4a is controlled in part by a link 68 which is pivotally connected to a pin 70 positioned at one end of the arm 50. An operating force in the direction of the arrow 72 exerted on the pin 70 through the link 68 urges the arm 50 towards the abutment 56, or what may be termed an "open" position, and conditions the circuit breaker 4a for an opening operation. Conversely, a force operating in the direction of the arrow 74 on the link 68 urges the operating arm 50 towards the abutment 54, or what may be termed a "close" position, and conditions the circuit breaker 4a for a closing operation.

Movement of the operating arm 50 under the influence of the opening and closing forces represented by the arrows 72 and 74 is controlled by a latch 76 pivotally mounted on a stationary shaft 78 for movement from the position illustrated in full lines in Fig. 2 to the position illustrated in dotted lines. This latch includes an armature portion 80 positioned for attraction by magnetic flux produced by a magnetic structure 82 having one or more energizing windings 84. The latch 76 is biased towards the position illustrated by dotted lines by means of a spring 86. In this position the latch engages an abutment 81.

Latching fingers 88 and 90 carried by the latch 76 are positioned for movement into and out of the path of a pin 92 which pivotally connects two levers 94 and 96. One end of the lever 94 is pivotally connected through the pin 70 to the operating arm 50. The remaining end of the lever 96 is pivotally connected to a fixed shaft 98.

By inspection of Fig. 2, it will be observed that when the armature 80 is attracted by the magnetic structure 82, the latching finger 88 is positioned in the path of travel of the pin 92 and prevents movement of the operating arm 50 away from its circuit breaker closed position. Similarly, if the circuit breaker is open and the latch 76 is in its dotted-line position, the latching finger 90 is in the path of movement of the pin 92 and retains the operating arm 50 in its circuit breaker open position.

Energization of the winding 84 may be in accordance with any desired variable quantity to prevent an opening operation of the circuit breaker 4a when the variable quantity is above a predetermined value. Such a variable quantity may be current flowing through the circuit breaker contacts, voltage across the circuit breaker contacts, or may include both voltage and current. For the purpose of this discussion, it will be assumed that the winding 84 is energized in accordance with voltage, and that the magnetic structure 82 is designed to pick up its armature to the full-line position when the voltage rises above a predetermined value, such as 80% of its normal rated value. As a further example, the magnetic structure 82 may be designed to permit the armature 80 to drop out or move to its dotted-line position when the voltage across the secondary of the associated transformer 4 drops below a predetermined value, such as 25% of its normal rated value. Under such circumstances, the latch 76 permits an opening operation of the associated circuit breaker 4a only when the voltage across the secondary of the transformer 4 drops below approximately 25% of its rated normal value, and permits a closing operation of the circuit breaker only if this voltage rises above approximately 80% of its normal rated value. The fingers 88 and 90 may have cam surfaces 89 and 91, respectively which facilitate passage of the pin 92 to latching position with respect to each of the fingers.

For operating the sectionalizing circuit breaker 4b, a bell crank 100 is pivoted for movement about a fixed support 102. At one end, the bell crank 100 carries a fork 104 which embraces the pin 70' for moving the arm 50' between its open and closed positions. The other end of the bell crank 100 is connected to an armature 106, the weight of which normally biases the operating arm 50' towards its closed position. The armature 106 is associated with a magnetic structure 108 having an energizing winding 110. This energizing winding may be connected through a suitable relay for energization in accordance with any desired variable quantity, such as current, voltage, or direction of power flow. For the purpose of this discussion, it is assumed that the energizing winding 110 is connected for energization in accordance with current flowing through the contacts 20' and 22' of the sectionalizing circuit breaker 4b.

For controlling the energization of the winding 110 a relay which may take the form of a bimetallic spring element 112, is provided. This bimetallic spring element has one end attached to a fixed support 114 and carries a movable contact 116 at its free end. Under normal conditions, the movable contact 116 is biased in engagement with a fixed contact 118. The bimetallic spring element 112 and the bimetallic spring 64' are connected in series with one of the pairs of contacts 20' and 22' for energization in accordance with the current flowing therethrough.

Current flowing through the bimetallic spring element 112 heats the element and actuates the free end of the element in the direction of the arrow 120. This direction is such that an excessive current flowing through the spring element separates the movable contact 116 from the fixed contact 118.

It will be observed that the energizing winding 110 is connected across the contacts 116 and 118. Consequently, separation of these contacts places the energizing winding in series with the bimetallic spring element 112, and the bimetallic spring 64' for energization in accordance with current flowing through the contacts 20' and 22'. Energization of the winding 110, in turn, operates to attract the armature 106 and move the operating arm 50' towards its open position. Such movement of the operating arm 50' separates the contacts 20' and 22' of the sectionalizing circuit breaker 4b.

It is desirable that the relay or bimetallic spring element 112 have a time delay and preferably an inverse time delay in its operation. Since bimetallic spring elements inherently have a time delay which varies inversely with the current passing therethrough, it follows that the bimetallic spring element 112 provides the desired characteristics.

Some faults resulting in a tripping operation of a circuit breaker are self-clearing. For this and other reasons, it is desirable that the sectionalizing circuit breaker 4b be permitted to reclose after a brief delay. Such operation may be obtained by positioning a lug 122 on the bimetallic spring element 112 for actuation into the path of movement of the lever 96'. By inspection of Fig. 2, it will be observed that when current flow through the bimetallic spring element 112 exceeds a predetermined excessive value, the contacts 116 and 118 separate to energize the winding 110. This energization of the winding 110, in turn operates to attract the armature 106 and to move the operating arm 50' to its open position. The movement of the operating arm 50' to its open position carries the pin 92' and levers 94' and 96' into the positions indicated by dotted lines. In this position, the lever 96' is held against a return movement by means of the lug 122. A cam surface 97 on the lever 96' facilitates movement of the lever into latching position.

Since the circuit breaker 4b has opened, the flow of current through the bimetallic spring element 112 ceases. As the spring element cools, it moves in a direction opposite to that indicated by the arrow 120 to carry the lug 122 away from the path of movement of the lever 96'. Consequently, the lug 122 prevents a reclosure of the sectionalizing circuit breaker 4b for a time sufficient to permit withdrawal of the lug 122 from the path of movement of the pin 92'. After such withdrawal, the bias of the armature 106 operating through the bell crank 100 and the bias of the spring 46' return the operating arm 50' to its open position.

To increase the time delay required to reclose the circuit breaker 4b, the contact 118 may be spring mounted to follow the movable contact 116 for a short distance. For example, the contact 118 may be mounted on one end of a cantilever spring 119 which is biased towards a stop 121. This construction permits the lug 122 to advance for a slightly greater distance into the path of movement of the lever 96'.

As previously pointed out, operation of the transformer circuit breaker 4a is determined in part by the force applied to the link 68. This link extends between the pins 70 and 70'. The force applied to the transformer circuit breaker 4a through the link 68 is determined by the movement of the operating arm 50' of the sectionalizing circuit breaker 4b. For this reason, an operation of the transformer circuit breaker 4a through the link 68 takes place only in response to an operation of the sectionalizing circuit breaker 4b.

It will be recalled that operation of the latch 76 prevents an actuation of the operating arm 50 of the transformer circuit breaker 4a under certain conditions. To permit operation of the sectionalizing circuit breaker 4b under these conditions, a resilient element 124 is included in the link 68. This resilient element may take the form of a spring which may be tensioned by a separation of the arms 50 and 50' from their full-line positions in Fig. 2 or compressed by an approach of the arms 50 and 50' towards each other from the positions shown in dotted lines in Fig. 2.

The operation of the spring 124 may be reviewed briefly. Assuming that the circuit breakers 4a and 4b are in the positions illustrated in Fig. 2 in full lines, a movement of the operating arm 50' to its dotted position opens the sectionalizing circuit breaker 4b. If the latch 76 happens to be in its dotted-line position, which corresponds to a loss of voltage across the secondary winding of the transformer 4, the movement of the arm 50' operates through the link 68 to pull the arm 50 of the transformer circuit breaker 4a to its dotted line position. Consequently, the tripping operation of the sectionalizing circuit breaker 4b results in a tripping operation of the transformer circuit breaker 4a.

However, if the latch 76 happens to be in its full-line position, the latching finger 88 prevents movement of the operating arm 50 and the movement of the operating arm 50' to its open position results in a lengthening and tensioning of the spring 124. It will be understood that the spring 124 biases the operating arm 50 of the transformer circuit breaker 4a towards its open position. Should the latch 76 subsequently move to its dotted-line position, which indicates a loss of voltage across the secondary of the transformer 4, the bias exerted by the spring 124 operates to pull the operating arm 50 of the transformer circuit breaker 4a to its open-circuit position, thereby opening the transformer circuit breaker.

Let it be assumed next that the sectionalizing circuit breaker 4b is in an open condition and that the lever 96' is latched by means of the lug 122. As the bimetallic spring element 112 cools, the lug 122 moves from the path of the lever 96' and permits a reclosure of the sectionalizing circuit breaker 4b. If the transformer circuit breaker 4a is in the position shown in full lines in Fig. 2 at the time the lug 122 moves from the path of the lever 96', reclosure of the sectionalizing circuit breaker 4b merely relieves the tension of the spring 124.

Should the transformer circuit breaker 4a be latched open by means of the latching finger 90 at the time the lug 122 is withdrawn from the path of movement of the lever 96', the reclosing operation of the sectionalizing circuit breaker 4b compresses the spring 124 and biases the operating arm 50 of the transformer circuit breaker 4a towards its closed position. Subsequent operation of the latching finger 90 to clear the pin 92 permits a reclosure of the transformer circuit breaker 4a under the bias of the compressed spring 124 and the spring 46.

From this brief analysis, it will be appreciated that the aforesaid operation of the transformer circuit breaker 4a occurs only in response to an operation of the sectionalizing circuit breaker 4b. Furthermore, the operation of the transformer circuit breaker 4a may be delayed or prevented by operation of the latch 76.

If the lug 60 or 60' is permanently positioned in the path of the tongue 62 or 62', as shown in Fig. 2, the foregoing analysis covers the complete operation of the circuit breakers illustrated in Fig. 2. However, in many systems it is desirable that a further control of the operations of the circuit breakers be effected by a suitable movement of the lug 60 or 60'. To this end the bimetallic springs 64 and 64' are connected respectively in series with the contacts of the associated circuit breakers 4a or 4b. For this reason, each of the bimetallic springs is heated in accordance with current flowing through the associated circuit breaker contacts. If the current flowing through the contacts of one of the circuit breakers exceeds a predetermined excessive value, the heating of the associated bimetallic spring moves the associated lug 60 or 60' from the path of movement of the tongue 62 or 62', thereby resulting in a tripping of the associated circuit breaker.

In the specific system herein discussed, the time delay of the bimetallic spring 64 or 64' is substantially greater than that of the bimetallic spring element 112. For this reason, the bimetallic spring element 112 operates first to trip the associated circuit breaker or circuit breakers in an effort to clear the faulty portion of the system. Should the fault persist, the bimetallic spring 64 or 64' operates to trip the associated circuit breaker and prevent further reclosure thereof. As a specific example, the bimetallic springs 64 and 64' may be proportioned to permit three or four tripping and closing operations under the control of the bimetallic spring element 112 prior to a tripping operation of the bimetallic spring 64 or 64'.

From the foregoing description, it is believed that the complete operation of the system illustrated in Fig. 1 may be set forth. Let it be assumed first that a fault F occurs between the transformers 4 and 5 as shown in Fig. 1. The resulting excessive flow of current tends to deflect the bimetallic springs 64, 64' and 112. Since the bimetallic spring 112 has a shorter time delay than that of the bimetallic spring 64 or 64', it separates its contacts 116 and 118 to energize the winding 110. Energization of the winding 110 operates through the bell crank 100 to trip the sectionalizing circuit breaker 4b. In addition, the lug 122 moves into position for latching the sectionalizing circuit breaker 4b open for a time sufficient to permit cooling of the bimetallic spring 112. At the end of this interval, the sectionalizing circuit breaker 4b recloses. Since voltage is present at the transformer 4, the latching finger 88 prevents a tripping operation of the transformer circuit breaker 4a.

If the fault or overload persists, the bimetallic spring 112 again is heated to produce a second tripping and reclosure operation of the sectionalizing circuit breaker 4b. This condition continues until the bimetallic spring 64' heats sufficiently to trip the sectionalizing circuit breaker 4b and prevent further operation thereof. As previously pointed out, the thermal characteristics of the bimetallic spring 64' may be selected to permit approximately three or four tripping and closing operations of the bimetallic spring 112 prior to a tripping operation of the spring 64'. If the bimetallic spring 64' carries more current under these conditions than the bimetallic spring 64, or if the former has a slightly shorter time delay, the sectionalizing circuit breaker 4b trips before the bimetallic spring 64 can trip the transformer circuit breaker. Consequently, the transformer circuit breaker 4a remains closed and continues to supply electrical energy to the load circuit.

Assume next that the fault F is accompanied by a loss of voltage at the transformer 4. The sectionalizing circuit breaker 4b again trips as above set forth. However, since a loss of voltage results in a movement of the latch 76 to the position indicated in dotted lines in Fig. 2, the opening operation of the sectionalizing circuit breaker 4b results in an opening operation of the transformer circuit breaker 4a. The sectionalizing circuit breaker 4b again goes through its reclosing cycle and finally remains closed or trips out as previously set forth. However, the transformer circuit breaker 4a remains open for the reason that the latching finger 90 remains in the path of movement of the pin 92 (see Fig. 2). Should full voltage appear across the secondary winding of the transformer 4 after the sectionalizing breaker 4b has reclosed, the latch 76 is picked up to permit reclosure of the transformer circuit breaker 4a.

It will be observed that the fault F is directly connected to the circuit breakers 5a and 5b. Since operation of the sectionalizing circuit breaker 5b does not affect the connection of the fault to the transformer circuit breaker 5a, the bimetallic spring 64 of the transformer circuit breaker 5a finally trips to disconnect the transformer 5 from the fault regardless of the operation of the sectionalizing circuit breaker 5b.

Since the sectionalizing circuit breaker 5b carries fault current, it goes through a tripping and reclosing cycle similar to that of the sectionalizing circuit breaker 4b and either recloses permanently in the event that the fault is self-clearing or is permanently tripped open by its bimetallic spring 64'. In this manner, the adjacent breakers operate to clear a faulty portion of the distribution system.

It should be observed further that after a tripping operation of the sectionalizing circuit breaker under the influence of the bimetallic spring 64', the transformer circuit breaker 4a may be either latched open by operation of the latching finger 90, or it may reclose if voltage is present across the secondary winding of the associated transformer. In the latter case, the associated transformer is fully protected by operation of the bimetallic spring 64 associated with the transformer circuit breaker 4a.

After a tripping operation initiated by the bimetallic springs 64 and 64', the circuit breakers may be reset manually to permit a subsequent reclosure thereof. Such resetting may be effected by moving the operating arms 50 and 50' of the circuit breakers to their open positions and then releasing the arms. Such operation relatches the tongues 62 and 62' beneath the associated lugs 60 and 60'.

Although the ends of the load circuit are illustrated in Fig. 1 as unconnected, these ends may be connected to form a loop as hereinafter pointed out.

Figure 4:
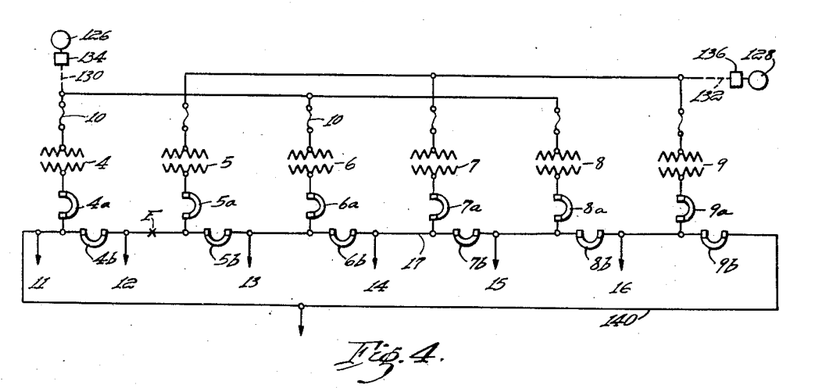
Fig. 4 is a schematic view in single line illustrating a modification of the electrical distribution system of Fig. 1.

In the modification shown in Fig. 4, the transformers 4 to 9 are associated with a plurality of sources of electrical energy 126 and 128 through feeder circuits 130 and 132. Feeder circuit breakers 134 and 136 are positioned in the feeder circuits adjacent the sources to control the connection of the feeder circuits to the sources. Although the feeder circuits may be connected to a common source of energy through different routes, for the purpose of illustration the feeder circuits are shown connected to separate sources of energy. In the specific example illustrated in Fig. 4, the transformers 4, 6 and 8 are energized through the feeder circuit 130 from the source of energy 126. The remaining transformers are energized through the feeder circuit 132 from the source of energy 128.

Since the load circuits of Fig. 4 may be energized from either of the feeder circuits, upon the occurrence of a fault on one of the feeder circuits it is desirable that only the faulty feeder circuit be removed from service and that the remaining feeder circuit together with the associated transformers, remain in service.

This desirable operation is provided by the apparatus illustrated in Fig. 2. The latch 76 is of particular value when employed in a system similar to that of Fig. 4, as will be apparent from a brief discussion of the operation of the system shown in Fig. 4.

Let it be assumed that the system of Fig. 4 is operating normally and receiving energy from both of the feeder circuits 130 and 132. If a fault occurs on one of the feeder circuits, such as the feeder circuit 130, electrical energy flows directly from the source 126 to the fault. Furthermore, electrical energy flows from the source 128 through the feeder circuit 132, the transformers 5, 7 and 9, the tie circuit 17 and the transformers 4, 6 and 8 to the same fault.

The feeder circuit breaker 134 trips in response to the fault current flowing from the source 126 to the fault on the associated feeder circuit 130. This feeder circuit breaker may be of a conventional reclosing type which recloses and trips a predetermined number of times and finally locks open if the fault fails to clear within the reclosing cycle thereof.

Fault currents flowing through the sectionalizing circuit breakers 4b and 9b heat the associated bimetallic spring elements 112 and trip these circuit breakers. Since the transformer circuit breaker 9a is connected to the sound feeder circuit 132, voltage is present at the circuit breaker and its latch 76 retains the circuit breaker in closed condition. Consequently, the transformer 9 continues to supply electrical energy to the various loads.

However, the transformer circuit breaker 4a is connected to the faulty feeder circuit 130 and the magnetic structure 82 associated therewith is deenergized. For this reason, the latch 76 associated with the transformer circuit breaker 4a is actuated by its spring 86 to the position illustrated in dotted lines in Fig. 2. With the latch in this position, the opening operation of the associated sectionalizing circuit breaker 4b operates through the link 68 to open the transformer circuit breaker 4a.

At the end of the time delays determined by the cooling of the bimetallic spring elements 112, the sectionalizing circuit breakers 4b and 9b reclose to restore the loop circuit for energization from the transformers 5, 7 and 9 associated with the sound feeder circuit 132. Since no voltage is present across the secondary winding of the transformer 4, the latch 76 prevents reclosure of the transformer circuit breaker 4a.

If the fault on the feeder circuit 130 clears within the reclosing cycle of the feeder circuit breaker 134, the feeder circuit breaker recloses and remains closed to energize the transformer 4. Such energization operates to pick up the latch 76 associated with the transformer circuit breaker 4a and results in reclosure of this transformer circuit breaker. The system consequently is restored for full normal operation.

In the event that the fault on the feeder circuit 130 is permanent the feeder circuit breaker 134 goes through its reclosing cycle and finally locks open. This means that the transformer circuit breaker 4a remains open until the faulty feeder circuit 130 is repaired and the feeder circuit breaker 134 is manually reclosed. Manual reclosure of the feeder circuit breaker 134 restores voltage to the transformer 4 and permits reclosure of the transformer circuit breaker 4a. Since the transformer circuit breakers 6a and 8a also are connected to the faulty feeder circuit, the operations of these transformer circuit breakers and their associated sectionalizing circuit breakers are similar to those discussed for the transformer circuit breaker 4a and its sectionalizing circuit breaker 4b. The transformer circuit breakers 5a and 7a are connected to the sound feeder circuit. Consequently the operations of the transformer circuit breakers 5a and 7a and their associated sectionalizing circuit breakers are similar to those discussed for the circuit breakers 9a and 9b.

Let it be assumed next that the fault F occurs on the tie circuit 17 between the sectionalizing circuit breakers 4b and 5b. Since the sectionalizing circuit breakers 4b and 5b are closest to the fault, they will be the first circuit breakers to trip. It will be noted that under these conditions voltage is present at both of the transformer circuit breakers 4a and 5a. Consequently, the associated latches 76 of these transformer circuit breakers retain the circuit breakers in closed condition despite the tripping of the sectionalizing circuit breakers 4b and 5b.

After tripping, the sectionalizing circuit breakers 4b and 5b go through their reclosing cycles. If the fault F clears prior to completion of these reclosing cycles, the sectionalizing circuit breakers close and remain closed to restore the complete system for normal operation. Should the fault F be permanent, the bimetallic springs 64' associated with the sectionalizing circuit breakers 4b and 5b finally trip these circuit breakers and prevent further reclosure thereof.

The tripping of the sectionalizing circuit breakers 4b and 5b isolates the fault F from the transformer circuit breaker 4a. Consequently, the fault F has no further effect on this circuit breaker.

It should be observed, however, that the fault F still is connected directly to the transformer circuit breaker 5a. As previously pointed out, if no bimetallic springs 64 are provided for the transformer circuit breakers and if the levers 40 are maintained permanently in the positions illustrated in full lines in Fig. 2, the transformer circuit breakers remain closed as long as voltage is present to energize their respective magnetic structures 82. In such a case the transformer circuit breaker 5a would remain closed for the fault F and the fuses 10 associated with the transformer 5 would blow to deenergize the transformer. Deenergization of the transformer results in release of the latch 76 associated with the transformer circuit breaker 5a and permits opening of this circuit breaker under the influence of the tension stored in the spring 124 when the sectionalizing circuit breaker 5b opened.

Under these circumstances, the transformer circuit breaker 5a is never called upon to open load current. For this reason the transformer circuit breaker 4a need not be designed to interrupt heavy currents and may be of simplified construction. In other words, the transformer circuit breaker would trip only in response to absence of voltage at the associated transformer. Since this generally indicates that no current flows through the contacts of the associated transformer breaker, the control afforded by the latch 76 may be employed to reduce substantially the current interrupting capacity requirements of the associated transformer circuit breaker. As previously pointed out, the magnetic structure 82 may be energized in accordance with both voltage and current present at the associated transformer to prevent release of the latch 76 for a tripping operation of the associated transformer circuit breaker unless both the voltage present at the transformer and the current flowing therethrough are below predetermined values.

Utilization of both current and voltage for controlling the opening of a transformer circuit breaker in this manner is discussed in greater detail in the aforesaid Parsons application.

In the specific embodiment herein illustrated, each of the transformer circuit breakers is provided with one of the bimetallic springs 64 for tripping the associated circuit breaker. With such a construction current flowing through the transformer circuit breaker 5a to the fault F heats the associated bimetallic spring 64. At the end of the time delay for which the bimetallic spring 64 is designed, the transformer circuit breaker 5a trips to disconnect the transformer 5 from the fault. Therefore, the system illustrated in Fig. 4 continues in operation except for the transformer 5 and the small portion of the system associated with the load circuit 12.

Although the application has been discussed with reference to certain specific embodiments thereof, numerous modifications are possible. Therefore, the invention is to be restricted only by the appended claims when interpreted in view of the prior art.

We claim as our invention:

1. In an electrical distribution system, a first electrical circuit, a plurality of second electrical circuits connected to said first electrical circuit at spaced points, first means for disconnecting portions of said first electrical circuit to segregate one of said electrical circuits from other of said electrical circuits, second means for each of said second electrical circuits for controlling the connection of each of said second electrical circuits to said first electrical circuit, means responsive to a first predetermined variable quantity for operating the first and second means associated with one of said electrical circuits, and means responsive to a second predetermined variable electrical quantity present in a portion of the system connected to each of said second means for controlling the operativeness of the associated one of said second means.

2. In an arrangement for distributing electrical energy, an electrical distribution system, a first circuit breaker associated with said electrical distribution system for connecting and disconnecting first portions of said distribution system, a second circuit breaker associated with said electrical distribution system for connecting and disconnecting second portions of said distribution system, means responsive to a first variable quantity present in said distribution system for tripping said first circuit breaker, means responsive to a tripping operation of said first circuit breaker for tripping said second circuit breaker, means preventing a tripping operation of said second circuit breaker, and means responsive to a second variable quantity present in said distribution system for rendering said preventing means ineffective to prevent a tripping operation of said second circuit breaker.

3. In an electrical distribution system, a distribution circuit, means for supplying electrical energy to said distribution circuit, said means including a plurality of transformers having secondary windings connected to said distribution circuit, a separate transformer circuit breaker for connecting and disconnecting each of said transformers relative to said distribution circuit, a sectionalizing circuit breaker for disconnecting the distribution circuit between two of said transformer circuit breakers, control means responsive to a variable quantity present in said distribution circuit for tripping said sectionalizing circuit breaker, means responsive to a tripping operation of said sectionalizing circuit breaker for applying an opening force to one of said two transformer circuit breakers, and means permitting a tripping operation of said one transformer circuit breaker in response to said opening force only for a predetermined condition of the electrical energy supplied to said one transformer circuit breaker.

4. In an electrical distribution system, a plurality of transformers each having a secondary winding, tie means connecting said secondary windings in parallel, a sectionalizing circuit breaker in said tie means between each pair of said secondary windings for interrupting the connection between said pair of secondary windings through said sectionalizing circuit breaker, a separate transformer circuit breaker connecting each of said secondary windings to said tie means, said circuit breakers being arranged in pairs each including a transformer circuit breaker and an adjacent sectionalizing circuit breaker, and separate control means for each of said pairs of circuit breakers, each of said control means comprising, means responsive to current flowing through the associated sectionalizing circuit breaker for tripping said associated sectionalizing circuit breaker, means responsive to a tripping operation of said associated sectionalizing circuit breaker for applying a tripping force to the associated transformer circuit breaker, and means permitting a tripping operation of said associated transformer circuit breaker in response to said tripping force only when the voltage present at the associated transformer circuit breaker is below a predetermined value.

5. In an arrangement for distributing electrical energy, an electrical distribution system, a first circuit breaker associated with said electrical distribution system for connecting and disconnecting first portions of said distribution system, a second circuit breaker associated with said electrical distribution system for connecting and disconnecting second portions of said distribution system, means responsive to the condition of said distribution system when a fault occurs thereon for tripping said circuit breakers, said last-named means including means for reclosing said first circuit breaker, means responsive to reclosure of said first circuit breaker for applying a reclosing force to said second circuit breaker, means preventing reclosure of said second circuit breaker, and means responsive to a variable electrical quantity present in the electrical energy supplied to said second circuit breaker for rendering said preventing means ineffective to prevent reclosure of said second circuit breaker.

6. In an electrical distribution system, a distribution circuit, means for supplying electrical energy to said distribution circuit, said means including a plurality of transformers having secondary windings connected to said distribution circuit, a separate transformer circuit breaker for connecting and disconnecting each of said transformers relative to said distribution circuit, a sectionalizing circuit breaker for disconnecting the distribution circuit between two of said transformer circuit breakers, control means for tripping said circuit breakers, said control means including means for reclosing said sectionalizing circuit breaker, means responsive to reclosure of said sectionalizing circuit breaker for applying a reclosing force to one of said transformer circuit breakers, and means permitting reclosure of said last-named circuit breaker in response to said reclosing force only for a predetermined condition of the electrical energy supplied to said last-named circuit breaker.

7. In an electrical distribution system, a plurality of transformers each having a secondary winding, tie means connecting said secondary windings in parallel, a sectionalizing circuit breaker in said tie means between each pair of said secondary windings for interrupting the connection between said pair of secondary windings through said sectionalizing circuit breaker, a separate transformer circuit breaker connecting each of said secondary windings to said tie means, said circuit breakers being arranged in pairs each including a transformer circuit breaker and an adjacent sectionalizing circuit breaker, and separate control means for each of said pairs of circuit breakers, each of said control means comprising means responsive to current flowing through the associated sectionalizing circuit breaker for tripping said associated sectionalizing circuit breaker, said control means being effective for reclosing said sectionalizing circuit breaker, means selectively responsive to a tripping or closing operation of said associated sectionalizing circuit breaker for applying respectively a tripping or closing force to the associated transformer circuit breaker, and means permitting a tripping operation of said associated transformer circuit breaker in response to said tripping force only when the voltage present at the associated transformer circuit breaker is below a predetermined value, said last-named means being effective for permitting a closing operation of associated transformer circuit breaker in response to said closing force only when the voltage present at the associated transformer circuit breaker is above a predetermined value.

8. In an electrical distribution system, a distribution circuit, means for supplying electrical energy to said distribution circuit, said means including a plurality of transformers having secondary windings connected to said distribution circuit, a separate transformer circuit breaker for connecting and disconnecting each of said transformers relative to said distribution circuit, a sectionalizing circuit breaker for disconnecting the distribution circuit between two of said transformer circuit breakers, and control means for tripping said circuit breakers, said control means including means for reclosing said sectionalizing circuit breaker, means responsive to reclosure of said sectionalizing circuit breaker for applying a reclosing force to one of said transformer circuit breakers, means permitting reclosure of said last-named circuit breaker in response to said reclosing force only for a predetermined condition of the electrical energy supplied to said last-named circuit breaker, and means responsive to prompt tripping of said sectionalizing circuit breaker following a plurality of successive reclosures thereof for preventing further reclosure of said sectionalizing circuit breaker.

9. In an electrical distribution system, a distribution circuit, means for supplying electrical energy to said distribution circuit, said means including a plurality of transformers having secondary windings connected to said distribution circuit, a separate transformer circuit breaker for connecting and disconnecting each of said transformers relative to said distribution circuit, a sectionalizing circuit breaker for disconnecting the distribution circuit between two of said transformer circuit breakers, control means responsive to a variable quantity present in said distribution circuit for tripping said sectionalizing circuit breaker, means responsive to a tripping operation of said sectionalizing circuit breaker for applying an opening force to one of said two transformer circuit breakers, means permitting a tripping operation of said one transformer circuit breaker in response to said opening force only for a predetermined condition of the electrical energy supplied to said one transformer circuit breaker, and means responsive to a variable quantity present in the electrical energy supplied to said one transformer circuit breaker for tripping said one transformer circuit breaker independently of the tripping control thereof by said sectionalizing circuit breaker.

10. In an arrangement for distributing electrical energy, an electrical distribution system, a first circuit breaker associated with said electrical distribution system for connecting and disconnecting first portions of said distribution system, a second circuit breaker associated with said electrical distribution system for connecting and disconnecting second portions of said distribution system, means responsive to a first variable quantity present in said distribution system for tripping said first circuit breaker, means responsive to a tripping operation of said first circuit breaker for tripping said second circuit breaker, means preventing a tripping operation of said second circuit breaker, means responsive to a second variable quantity present in the electrical energy supplied to said second circuit breaker for rendering said preventing means ineffective to prevent a tripping operation of said second circuit breaker, and means responsive to a predetermined variable quantity present in the electrical energy supplied to said first circuit breaker for tripping said first circuit breaker independently of said first-named tripping means.

11. In an arrangement for distributing electrical energy, an electrical distribution system, a first circuit breaker associated with said electrical distribution system for connecting and disconnecting first portions of said distribution system, a second circuit breaker associated with said electrical distribution system for connecting and disconnecting second portions of said distribution system, means responsive to a first variable quantity present in the electrical energy supplied to said first circuit breaker for tripping said first circuit breaker, means responsive to a tripping operation of said first circuit breaker for tripping said second circuit breaker, means preventing a tripping operation of said second circuit breaker, means responsive to a second variable quantity present in the electrical energy supplied to said second circuit breaker for rendering said preventing means ineffective to prevent a tripping operation of said second circuit breaker, means responsive to a predetermined variable quantity present in the electrical energy supplied to said first circuit breaker for tripping said first circuit breaker independently of said first-named tripping means, and means responsive to a predetermined variable quantity present in the electrical energy supplied to said second circuit breaker for tripping said second circuit breaker independently of the tripping of said first circuit breaker.

12. In an electrical system, a first circuit breaker for controlling a first portion of an electrical system, said circuit breaker having actuating means comprising a first operating member operable from a first condition to a second condition for actuating said circuit breaker, a second circuit breaker for controlling a second portion of an electrical system, said second circuit breaker having actuating means comprising a second operating member operable from a first condition to a second condition for actuating said second circuit breaker, means responsive to operation of said second operating member to its second condition and effective when said second operating member is in its second condition for urging said first operating member towards the second condition of said first operating member, means preventing operation of said first operating member under the influence of said urging, and means operable when said second operating member is in its second condition for rendering said preventing means ineffective to prevent said operation of said first operating member.

13. In an electrical system, a first circuit breaker for controlling a first portion of an electrical system, said circuit breaker having actuating means comprising a first operating member operable from a first condition to a second condition for actuating said circuit breaker, a second circuit breaker for controlling a second portion of an electrical system, said second circuit breaker having actuating means comprising a second operating member operable from a first condition to a second condition for actuating said second circuit breaker, means responsive to operation of said second operating member to its second condition and effective when said second operating member is in its second condition for urging said first operating member towards the second condition of said first operating member, said last-named means including resilient linkage permitting independent operation of said members, means preventing operation of said first operating member under the influence of said urging, and means operable when said second operating member is in its second condition for rendering said preventing means ineffective to prevent said operation of said first operating member.

14. In an electrical system, a first circuit breaker for controlling a first portion of an electrical system, said circuit breaker having actuating means comprising a first operating member operable between a first position wherein the circuit breaker is closed and a second position wherein the circuit breaker is tripped, a second circuit breaker for controlling a second portion of an electrical system, said second circuit breaker having actuating means comprising a second operating member operable between a first portion wherein said second circuit breaker is closed and a second position wherein said second circuit breaker is tripped, means responsive to operation of said second operating member to either of its positions for biasing said first operating member towards its corresponding position, latching means for retaining said first operating member in either of its positions despite said bias, and electro-responsive means for actuating said latching means to release said first operating member for movement from one of its positions to the other of its positions.

15. In an electrical system, a first circuit breaker for controlling a first portion of an electrical system, said circuit breaker having actuating means comprising a first operating member operable between a first position wherein the circuit breaker is closed and a second position wherein the circuit breaker is tripped, a second circuit breaker for controlling a second portion of an electrical system, said second circuit breaker having actuating means comprising a second operating member operable between a first position wherein said second circuit breaker is closed and a second position wherein said second circuit breaker is tripped, means responsive to operation of said second operating member to either of its positions for biasing said first operating member towards its corresponding position, latching means for retaining said first operating member in either of its positions despite said bias, said latching means being biased to retain said first operating means in one of its two said positions, and electroresponsive means for actuating said latching means to release said first operating means from said one of its two positions for movement to, and retention in, the other of said two positions.

16. In an electrical system, a first circuit breaker for controlling a first portion of an electrical system, said circuit breaker having actuating means comprising a first operating member operable between a first position wherein the circuit breaker is closed and a second position wherein the circuit breaker is tripped, a second circuit breaker for controlling a second portion of an electrical system, said second circuit breaker having actuating means comprising a second operating member operable between a first position wherein said second circuit breaker is closed and a second position wherein said second circuit breaker is tripped, means responsive to operation of said second operating member to either of its positions for biasing said first operating member towards its corresponding position, latching means for retaining said first operating member in either of its positions despite said bias, electroresponsive means for actuating said latching means to release said first operating member for movement from one of its positions to the other of its positions, means for operating said second operating member to its second position and for returning said second member to its first position, and means operable only for tripping said second circuit breaker, whereby in response to an operation of said last-named means said second circuit breaker remains tripped.

17. In an electrical system, a first circuit breaker for controlling a first portion of an electrical system, said circuit breaker having actuating means comprising a first operating member operable between a first position wherein the circuit breaker is closed and a second position wherein the circuit breaker is tripped, a second circuit breaker for controlling a second portion of an electrical system, said second circuit breaker having actuating means comprising a second operating member operable between a first position wherein said second circuit breaker is closed and a second position wherein said second circuit breaker is tripped, means responsive to operation of said second operating member to either of its positions for biasing said first operating member towards its corresponding position, latching means for retaining said first operating member in either of its positions despite said bias, electroresponsive means for actuating said latching means to release said first operating member for movement from one of its positions to the other of its positions, and means for tripping said first circuit breaker independently of operation of said second operating member.

18. In an electrical system, a first circuit breaker for controlling a first portion of an electrical system, said circuit breaker having actuating means comprising a first operating member operable between a first position wherein the circuit breaker is closed and a second position wherein the circuit breaker is tripped, a second circuit breaker for controlling a second portion of an electrical system, said second circuit breaker having actuating means comprising a second operating member operable between a first position wherein said second circuit breaker is closed and a second position wherein said second circuit breaker is tripped, means responsive to operation of said second operating member to either of its positions for biasing said first operating member towards its corresponding position, said last-named means including resilient linkage permitting independent operation of said members, latching means for retaining said first operating member in either of its positions despite said bias, electroresponsive means for actuating said latching means to release said first operating member for movement from one of its positions to the other of its positions, means responsive to current passing through said first circuit breaker for tripping said first circuit breaker and preventing reclosure thereof by operation of said linkage, means responsive to current passing through said second circuit breaker for tripping said second circuit breaker and preventing reclosure thereof by operation of said second operating member, said last-named means having a substantial time delay in operation, and means responsive to current passing through said second circuit breaker for actuating said second operating member to its second position and subsequently returning said second operating member to its first position, said last-named means having a time delay in operation less than said first-named time delay.

LEON R. LUDWIG.
JOHN W. MAY.